United States Patent [19]

Chesnut et al.

[11] 4,112,125

[45] Sep. 5, 1978

[54] SEMI-MOIST SHELF STABLE PARTICLE FOR CARRYING A FOOD COLOR AND FLAVOR

[75] Inventors: Jon C. Chesnut, Chicago; Edward Epstein, Arlington Heights, both of Ill.

[73] Assignee: Beatrice Foods Co., Chicago, Ill.

[21] Appl. No.: 768,725

[22] Filed: Feb. 15, 1977

[51] Int. Cl.² .................. A23L 1/226; A23L 1/275; A21D 10/00
[52] U.S. Cl. ............................. 426/250; 426/540; 426/578; 426/573; 426/555; 426/653; 426/619
[58] Field of Search ............... 426/96, 103, 250, 578, 426/653, 656, 619, 104, 802, 573, 1

[56] References Cited

U.S. PATENT DOCUMENTS

| | | | |
|---|---|---|---|
| 2,855,315 | 10/1958 | Perrozzi et al. | 426/103 |
| 3,671,264 | 6/1972 | Drews et al. | 426/578 |
| 3,736,149 | 5/1973 | Knapp | 426/103 |
| 3,833,741 | 9/1974 | Katz | 426/103 |
| 3,922,354 | 11/1975 | Galluzzi et al. | 426/578 |

*Primary Examiner*—Jeanette M. Hunter
*Attorney, Agent, or Firm*—Murray and Whisenhunt

[57] ABSTRACT

A semi-moist, semi-soft, shelf-stable and non-bleeding particle for carrying a food flavor contains 5–30% protein, 5–70% gelatinized starch, 5–40% vegetable fat and at least one of 5–50% dextrose and 5–50% sucrose. The moisture content is between 2 and 30%. The particles may be flavored with natural and artificial fruit flavors, cheese flavors, etc. The texture, mouth feel and flavors closely approximate the natural corresponding particles. The particles may be used in various conventional food compositions such as dry muffin and cake mixes.

25 Claims, No Drawings

SEMI-MOIST SHELF STABLE PARTICLE FOR CARRYING A FOOD COLOR AND FLAVOR

The present invention relates to particles for carrying a food flavor and more particularly such particles where the texture may be characterized as semi-moist and semi-soft. This texture provides a mouth feel similar to corresponding natural food particles such as fruit and berry particles. Even more particularly, the invention is concerned with such particles which may be colored and flavored with conventional good colors and flavors and those colors and flavors will not bleed into surrounding food compositions, e.g., a muffin mix. The particles, per se, are sufficiently bland that they may be used for carrying even delicate fruit and vegetable flavors.

BACKGROUND OF THE INVENTION

In many food compositions, it is desirable to incorporate particles of natural food such as fruits, berries, vegetables and the like. Natural food particles are subject to spoilage and deterioration of color, taste, and texture, unless special provisions are made for preserving those particles, e.g., drying and the like. Under the circumstances, it is difficult to incorporate into conventional food compositions particles derived from the natural foods, while maintaining the semi-moist and semi-soft properties thereof, and little success in this effort has been achieved in the art. Raisins, for example, may be incorporated into cereals, since this dried natural food particle retains sufficient moisture to maintain semi-soft and semi-moist properties while yet being preserved. Likewise, dried blueberries may be incorporated into pastries and cakes, such as a conventional muffin mix, since blueberries may be dried to moisture contents such that the product is a semi-moist and semi-soft particle, while also being preserved. However, success of this nature is limited and often the drying causes such changes that the product is not acceptable to the consuming public.

Alternative methods are used to avoid these undesired drying effects. An example is that of "candying" food particle, i.e., infusing such a high level of sucrose, and sometimes at least in part dextrose, into the food particle that preservation thereof is achieved while still retaining a semi-soft texture. A notable example of this approach is cake which has incorporated therein candied fruits. However, this very high level of sugar not only most significantly changes the taste of the candied fruit, but, particularly with sugar, also allows undesired crystallization of the sugar and even migration of the sugar into surrounding food composition, particularly with dextrose.

Therefore, the art has attempted to avoid these problems with natural food particles by providing a variety of simulated natural food particles. While these efforts have taken a variety of forms, all of these approaches have suffered from one or more serious disadvantages. For example, a semi-soft jellied and flavored composition may be encapsulated in a relatively impervious capsule for dispersion in the food composition. However, the impervious encapsuled particle is normally relatively hard and the immediately encountered texture during mastication is not semi-moist or semi-soft but hard and brittle, very unlike the natural food particle. The opposite approach has also been suggested where a jellied and flavored simulated food particle is incorporated into a food composition. In this case, without the imprevious protecting encapsulant, the flavors and colors of the simulated food particle tend to "bleed" into the surrounding food composition. For example, a blueberry muffin made with simulated blueberry particles may well result in a muffin which is either entirely blue or where great areas have been turned blue by bleeding of the blue color from the simulated blueberry particles. Likewise, the flavors can bleed into the muffin and instead of having a muffin with descrete bits of simulated blueberry particles, the muffin may have a relatively homogeneous blueberry taste. This is, of course, unacceptable for most applications.

The art has attempted to avoid the aforementioned problem by gelling the simulated particles with gelling agents such as gums, e.g., alginates and the like, so that the bleeding of the color and flavor is mitigated. However, with these approaches the resulting food particle no longer remains semi-moist and semi-soft but more closely approximates the texture of a candy "gum drop". Similar efforts depend on combinations of high melting point fats, gelatinized starch and combinations of sucrose and dextrose, but these are relatively expensive and the high melting point fat gives a somewhat "waxy" mouth feel. See U.S. Pat. No. 3,671,264 for an example of this effort in the art.

These prior art approaches have experienced additional difficulties when dealing with natural flavors. As can be appreicated, imitation flavors can be highly concentrated and only a small amount will provide sufficient flavoring for a simulated food particle. On the other hand, when natural flavors are used, e.g., concentrated juices and the like, the required volume for adequate flavoring is often much greater. Further, the natural ingredients of the concentrated natural flavors can adversely affect the properties of the simulated food particles and, in extreme cases, cause de-gelation of the particles. Accordingly, the prior art approaches have not been able to satisfactorily flavor the food particles with both imitation and natural flavors, and this is a decided disadvantage since the range of flavors are correspondingly limited and the trueness of the flavor imparted to the simulated food particle is often less than desired.

Finally, these prior art approaches have often resulted in particles which are not truly shelf stable. With time the particles often lose moisture and correspondingly lose the semi-soft texture. This usually occurs by bleeding of the moisture into the surrounding food composition and a corresponding dehydration of the simulated food particle. Further, these simulated particles are often substantially deteriorated by elevated temperatures and the jellied texture can be substantially changed to a more brittle texture, and in some cases the elevated temperatures can cause excessive bleeding of the simulated food particle. Shelf stability is often further deteriorated by bacterial action, especially with the higher moisture contents of the simulated food particles.

As can therefore be easily appreciated, these difficulties in the art have resulted in simulated food particles which have properties that are considerably less that than which is desired. It would, therefore, be of decided advantage in the art to provide such food particles which obviate these difficulties.

OBJECTS OF THE INVENTION

It is therefore an object of the invention to provide a semi-moist, semi-soft, shelf-stable and non-bleeding particle for carrying a food flavor. It is a further object of this invention to provide such particle with coloring agents and flavors therein. It is a further object of the invention to provide such particles where the flavoring agent may be either a natural flavor or an imitation flavor. Finally, it is an object of the invention to provide food compositions which are mixtures of the particles and conventional food ingredients, but where the food composition remains shelf stable and the color and flavoring of the food particle will not bleed into the composition, either during shelf storage or during cooking of the food composition. Other objects will be apparent from the following disclosure and claims.

BRIEF DESCRIPTION OF THE INVENTION

The present invention is based upon three major discoveries. The first discovery is that a simulated food particle for carrying a food flavor can substantially mitigate the "bleeding" of conventional colors and flavors by the incorporation therein of gelatinized starch. The theoretical explanation for this result is not entirely clear, but it appears that the gelatinized starch has the ability to substantially absorb colors and flavors and substantially reduce the migration of the colors and flavors in a simulated food particle.

A second basic discovery is that long term semi-soft texture can be achieved when the gelatinized starch containing particles also contain a vegetable or dairy protein. It has been found that protein provides a texture which is similar to the texture of semi-soft natural food particles and that texture is retained even with long term storage.

The third major discovery is that the semi-moist character may be achieved by replacing part of the otherwise necessary water with a vegetable fat of relatively low melting point. This provides, in combination with moisture, sufficient "moisture-like" texture and mouth feel while at the same time reduces the water activity of the resulting particle to such a low level that microbial and fungal activity is substantially eliminated.

As a less important but none the less significant discovery, it has been determined that with the ingredients of protein, starch and fat, as defined above, the particle may be sweetened with either dextrose or sucrose or combinations thereof, and without incurring common difficulties of crystallization or migration. Apparently, this added advantage is a result of the combination of both the protein and gelatinized starch, although here again the theoretical explanation is not entirely clear.

Accordingly, there is provided a semi-moist, semi-soft, shelf-stable and non-bleeding particle for carrying a food flavor which comprises, by weight, 5% to 30% of vegetable or dairy protein, 0% to 50% dextrose, 0% to 50% sucrose, 5% to 70% gelatinized starch, and 5% to 40% vegetable fat having an average melt temperature of 110° F. or less. However, there must be at least one of the sucrose and dextrose in the composition in an amount of at least 5% and the moisture content must be between about 2% and 30%.

As a further feature of the invention, it has been discovered that forming the composition into a food particle may be substantially aided by the incorporation of up to 20% of cereal flour in the composition. This allows, for example, extruding of the composition without undue balling or galling in the extruder. Further, if exceptionally long term storage properties are required, the water activity may be further reduced by the incorporation of up to 15% humectant, e.g., glycerine.

Simulated food particles of that nature may be flavored with either natural or imitation flavors and still preserve the non-bleeding and shelf-stable characteristics. The flavored food particles may be in physical admixture with a conventional food composition, such as a muffin or cake composition, and that composition will remain shelf stable for long periods of time. The food particles have the further advantage that a dry composition, e.g., muffin composition, may be mixed with a liquid for cooking purposes, such as milk or water, and the good particle will not be substantially deteriorated during the mixing and cooking step by the added liquid.

DETAILED DESCRIPTION OF THE INVENTION

For purposes of the present application, the term "semi-moist" refers to that mouth feel which essentially simulates the moist mouth feel of natural foods, particularly fruits and berries. The actual mouth feel will, of course, vary with the particular fruit or berry being simulated, but it is contemplated in the invention that by adjustment of the ratio of ingredients, the mouth feel of moisture contents as high as that of blueberries and the like through moisture contents as low as carrots and the like may be simulated. Similarly, the term "semi-soft" contemplates a texture and mouth feel which simulate the semi-soft texture and mouth feel of natural foods ranging from foods as soft as blueberries to as hard as potatoes. The term "shelf-stable" contemplates that the composition may be stored under ambient conditions (especially room temperature) for at least one year without any consumer detectable deterioration of the properties during that period. The term "non-bleeding" contemplates that either during storage of the particles per se or during storage in a conventional food composition (either wet or dry) any bleeding of color or flavor from the particles will not be to an extent which is casually detectable by the consumer. Finally, the terms "carrying a food flavor" contemplate that the basic particle may have incorporated therein a variety of food flavors, both natural and artificial, and that the basic structure of the particle is acceptable for flavoring as desired.

The protein is a vegetable or dairy protein and the source thereof may vary widely. Quite suitably the vegetable protein is soy bean protein, such as soy bean meal and soy bean protein isolate, and the diary protein is derived from whey, e.g., whole whey, whey protein isolate, or the ultra-filtration protein isolate, all of which are known to the art. Alternatively, dairy proteins such as acid casein or alkali and alkaline earth caseinates (e.g., sodium caseinate, calcium caseinate, potassium caseinate, and magnesium caseinate) may be used. For purposes of the present specification and claims, cereal protein, such as wheat gluten is considered to be a vegetable protein and may be used, but this is not preferred. Animal protein, on the other hand, is not normally useful in the present invention, and the exception is that of substantially degraded animal protein in the form of gelatin. This protein has been degraded to the point that its properties are very similar to vegetable or dairy protein and, therefore, may be used in the composition, although this is not a preferred embodiment. For purposes of the present specification and claims, however, gelatin is contemplated and is incorporated, by functional similarity, in the definition of vegetable and dairy protein. The preferred range of protein is between 10% to 25%.

The dextrose used in the composition, if any, may be relatively pure dextrose or relatively impure dextrose. For example, the dextrose may be conveniently supplied by various DE corn syrup solids. Alternatively, whole corn syrup or other sources of dextrose may be used. In calculating the percentage of dextrose for the formulation, however, the purity of the dextrose and the source thereof should be considered. The preferred range of dextrose is up to 40%, e.g., up to 25% or 20%.

Similarly, the sucrose need not be in pure form but may indeed be in impure form. Even further, sucrose may be added as a simple sugar syrup by which both the correct amount of sucrose and water are added to the mixture. The preferred range of sucrose is up to 40%, e.g., up to 25% or 20% or 15%.

While not preferred, the composition may contain fructose and lactose in addition to sucrose or dextrose or mixtures thereof. However, since the DE (dextrose equivalent) is lower and since other flavors are introduced thereby, these sweeteners can normally be used only in those compositions where higher sweetness is not desired.

The gelatinized starch may be derived from any edible starch, particularly wheat, corn, potatoes, rice and tapioca. It is preferred, however, that the degree of gelatinization be at least 50% and more preferably at least 75%. Essentially fully gelatinized starch, e.g., 90% or 95% gelatinized is the preferred form of gelatinized starch. The preferred range of gelatinized starch is 5 to 50%, e.g., 20% to 40%.

The vegetable fat will have an average melting temperature of 110° F. or less and preferably 100° F. or less. For the more moist texture of the simulated food particles, the fat should be at least 50% an oil at room temperature and more preferably essentially be entirely an oil at room temperature. In this latter regard, corn oil functions most effectively as the fat and is a preferred oil, but any other oil of these properties and essentially mild or bland taste is quite satisfactory, e.g., soy bean oil, cottonseed oil, sunflower oil, safflower oil, palm oil, peanut oil, olive oil and mixtures thereof. The preferred range of fat is 8% to 23%.

As noted above either dextrose or sucrose or combination thereof may be used in the composition. In any case, however, at least one of sucrose and dextrose is contained in the composition in an amount of at least 5%, but more preferably at least 10% or even at least 15%. The amount of either dextrose alone or sucrose alone or the combination of the two, however, should not exceed 50% of the composition and more usually not more than 40% or even 25%. For the more moist textured products essentially no sucrose will be used and from 5% to 25% of dextrose alone will be in the compositions.

During mixing of the ingredients sufficient water should be added to provide moisture contents of between 2% and 30%, and more preferably between 5% and 25%. Often, water naturally occuring in the ingredients being mixed will provide moisture contents in this range. In that case, no water need be added. This is particularly true with natural flavors which are often concentrated juices.

As noted above, the composition will normally include at least one of a coloring agent and a flavoring agent, the latter of which may be either a natural flavor or an imitation flavor. In addition thereto, conventional preservatives such as BHA, HBT and the like may be incorporated into the composition. Also, for fruit flavors, food grade acids are incorporated to give the required acid "bite". Citric acid, lactic acid and the like are suitable for this purpose.

The simulated food particle are mixed with conventional food compositions. This is normally a physical admixture with the particles being produced separately from the mixture with the food composition. For example, the food composition may be a conventional muffin or cake composition with particles simulating blueberry particles physically admixed therewith. Alternatively, the food composition may be a cookie, pie, cereal, or candy composition, although any conventional food composition may be used in this regard.

While the particles may be produced in essentially any desired way, it is more convenient to mix the dry ingredients and then to disperse the colors and flavors in the essential liquid ingredient, e.g., the fat, humectants, etc. Mixing of the dry ingredients can be performed in any desired manner, such as a ribbon blender, Hobart mixer, etc. Similarly, dispersion of the color and flavor in the liquid ingredients may be of any desired mechanical mixer, e.g., a Hobart mixer. Conveniently the dispersion is slowly added to the dry ingredients in the ribbon blender and mixing is continued at room temperature until a homogeneous semi-solid dispersion is obtained. If sufficient water is not contained in the ingredients, then water is added during this latter mixing or with the mixing of the liquid ingredients to bring the moisture content to the desired level.

This semi-solid dispersion may then be formed in any desired manner. For example, it may be extruded in a California pellet mill and cut to appropriate sizes. Alternatively, it may be passed through a conventional meat grinder to produce particles of a desired size and shape. On the other hand, it may be formed in molds or it may be sheeted and cut with dies to desired shapes. The particular means of forming the shapes is not critical.

After preparing the desired shapes, the particles may be mechanically mixed with the conventional food composition, e.g., a muffin mix. That food composition may be in a form ready for cooking or in a dry form. In this latter regard, the dry form will normally be reconstituted with water or milk to provide a composition ready for cooking. The conventional food composition is cooked in the conventional manner, which cooking process does not form part of the present invention. As noted above, shelf stability is achieved by the combination of ingredients, as well as the resulting low water activity achieved thereby. It has been determined that the particles, e.g., in a pelletized form, should have a water activity of no greater than 0.85 and more preferably no greater than 0.70, especially a water activity of less than 0.65. These ranges of water activity will ensure shelf stability for at least 1 year. Water activity, for this purpose, is measured in the conventional manner, e.g., with a Sina Water Activity Meter, distributed by the Beckman Instrument Company.

If desired, various optional ingredients may be contained in the particles. For example, as noted above, up to 20%, e.g., 3% to 10%, cereal flour such as wheat, rye, oats, may be included in the composition prior to forming to improve pelletizing, e.g., by a meat grinder or California pellet mill or the like. Also as noted above, a humectant, in amounts up to 15%, especially from 1% to 10%, will lower the water activity. Glycerine is preferred but other glycols, such as propylene glycol, may be used. Common food condiments to taste may also be included, such as salt, spices and the like. Flavors other than vegetable, fruit and berry flavors may be incorporated to taste for special purposes, e.g., peppermint, cinnamon, nutmeg and the like. For special effects, other foods may be incorporated into the particles so long as these foods do not exceed the required maximum water activity. For example, chipped peanuts or peanut butter may be included. Filters such as ground popcorn, puffed corn meal, and the like may be included. These latter fillers tend to give a crunchy texture which can simulate the texture of certain vegetables, e.g., celery and the like. Other food additives of this nature will be readily apparent to those skilled in the art.

The invention will be illustrated by the following examples, where all percentages in the Examples, as well as in the foregoing specification and the following claims, are by weight unless otherwise specifically indicated. However, it should be fully appreciated that the invention is not limited to the illustrative examples, but extends to the scope set forth above.

EXAMPLE 1

Preparation of Flavored Particle

The following dry ingredients were mixed to a homogeneous blend in a ribbon blender:

sweet whey: 17.2 parts
dextrose (as corn syrup solids): 14.9 parts
sucrose: 7.4 parts
gelatinized corn starch (95%): 31.2 parts
wheat flour: 6.5 parts The following ingredients were mixed to a homogeneous dispersion of solids and liquids:

liquid corn oil: 13.7 parts
glycerine: 7.7 parts
USDA blue color: 1.1 parts
imitation blueberry flavor: 0.2 part
citric acid: 0.1 part The dispersion was slowly added to the dry ingredients in the ribbon blender and mixing at room temperature was continued until a homogeneous semi-solid dispersion was obtained. Water was added during mixing to reach a moisture content of 15%.

The semi-solid dispersion was passed through a California Pellet mill and cut to particles of approximately cylindrical shape having a diameter of about ⅛ inch and a length of about ¼ inch. The particles were semi-soft, in the nature of berry pulp, and could be stored at room temperature for at least 1 year without significant deterioration of the semi-soft and semi-moist texture, shelf-stable properties or loss of flavor.

EXAMPLE 2

Preparation of a Food Composition

The particles of Example 1 were mechanically mixed with a combination muffin mix of wheat flour, dry milk solids, sugar, powdered shortening, baking powder, and salt. This mixture remained shelf-stable for at least 1 year without significant loss of the semi-soft and semi-moist texture or flavor of the particles and the color in the particles did not significantly bleed into the dry muffin mix.

EXAMPLE 3

The muffin mix of Example 2 was mixed with milk to form a dough, placed in a muffin pan and baked at 375° F. until the dough was cooked. After cooling, the muffins were examined and the particles remained semi-soft and semi-moist and the color of the particles had not substantially bled into the baked muffins.

What is claimed is:

1. A semi-moist, semi-soft, shelf-stable and non-bleeding composition in the form of a particle for carrying a food flavor and color, comprising:
    (1) 5 to 30% of vegetable or dairy protein;
    (2) 0 to 50% of dextrose;
    (3) 0 to 50% of sucrose;
    (4) 5 to 70% of gelatinized starch;
    (5) 5 to 40% of vegetable fat having an average melt temperature of 100° F. or less; and
    (6) an effective amount of a color and flavor
but where at least one of the sucrose and dextrose is at least 5 % and the moisture content is between 5 and 30% and the water activity is 0.85 or less.

2. The composition of claim 1 which includes up to 20% of cereal flour.

3. The composition of claim 1 which includes up to 15% of a humectant.

4. The composition of claim 1 which contains both dextrose and sucrose in a combined amount of from 5% to 40%.

5. The composition of claim 1 which contains essentially no sucrose and from 5% to 40% of dextrose.

6. The composition of claim 1 wherein the protein is selected from soy bean protein, whey protein, gelatin, gluten and alkali caseinate and mixtures thereof.

7. The composition of claim 1 wherein the gelatinized starch is selected from corn, wheat, tapioca, potato and rice derived starch and mixtures thereof.

8. The composition of claim 1 wherein the gelatinized starch is at least 50% gelatinized.

9. The composition of claim 1 wherein the fat is at least 50% an oil at room temperature.

10. The composition of claim 9 wherein the oil is selected from corn oil, soy bean oil, cottonseed oil, sunflower oil, safflower oil and palm oil and mixtures thereof.

11. The composition of claim 1 wherein the percent of protein is between 10 and 25%.

12. The composition of claim 1 wherein the percent of dextrose is between 0 and 20%.

13. The composition of claim 1 wherein the percent of sucrose is between 0 and 15%.

14. The composition of claim 1 wherein the percent of gelatinized starch is between 20 and 40%.

15. The composition of claim 1 wherein the percent of fat is between 8 and 23%.

16. The composition of claim 1 wherein the percent of moisture is between 5 and 25%.

17. The composition of claim 1 which includes at least one of a preservative and food-grade acid.

18. The composition of claim 1 wherein the flavor includes a natural flavor.

19. The composition of claim 1 wherein the flavor includes an imitation flavor.

20. The composition of claim 1 in physical admixture with a food composition ready for cooking or in a dry form.

21. The composition of claim 20 wherein the food composition is a muffin or cake composition.

22. The composition of claim 21 wherein the good composition is a cookie composition.

23. The composition of claim 21 wherein the food composition is a pie composition.

24. The composition of claim 21 wherein the food composition is a cereal composition.

25. The composition of claim 21 herein the food composition is a candy composition.

* * * * *